United States Patent [19]

Young

[11] 4,197,575
[45] Apr. 8, 1980

[54] CONDUCTION THROUGH SENSING AND INVERTER PROTECTION SYSTEM

[75] Inventor: John A. I. Young, Peterborough, Canada

[73] Assignee: Canadian General Electric Company, Ltd., Toronto, Canada

[21] Appl. No.: 945,941

[22] Filed: Sep. 25, 1978

[30] Foreign Application Priority Data

Apr. 13, 1978 [CA] Canada .................................. 301105

[51] Int. Cl.² .......................................... H02M 7/515
[52] U.S. Cl. ......................................... 363/58; 363/96
[58] Field of Search .................................... 363/55–58, 363/96, 135–138

[56] References Cited
U.S. PATENT DOCUMENTS

| | | | |
|---|---|---|---|
| 3,609,507 | 9/1971 | Beck | 363/56 X |
| 3,760,258 | 9/1973 | Percorini et al. | 363/56 |
| 4,005,350 | 1/1977 | Brenneisen | 363/58 |
| 4,126,819 | 11/1978 | Stobbe et al. | 363/56 X |

Primary Examiner—William M. Shoop
Attorney, Agent, or Firm—Arnold E. Renner

[57] ABSTRACT

A control or protection system for a line commutated inverter detects prescribed conduction-through faults and initiates a control sequence for recovery without shutting down the inverter. A conduction sensor in each leg provides a signal representing conduction and this is compared with a signal representing the forbidden interval when conduction should not occur in that leg. When conduction is detected in a forbidden interval it normally indicates a conduction-through fault and the gating pulses are advanced for at least the next two pulses to occur immediately but with a limit of 60°. This causes commutation of the legs which are carrying the conduction-through fault current provided that sufficient volt-seconds remain in the alternating current part of the circuitry.

9 Claims, 13 Drawing Figures

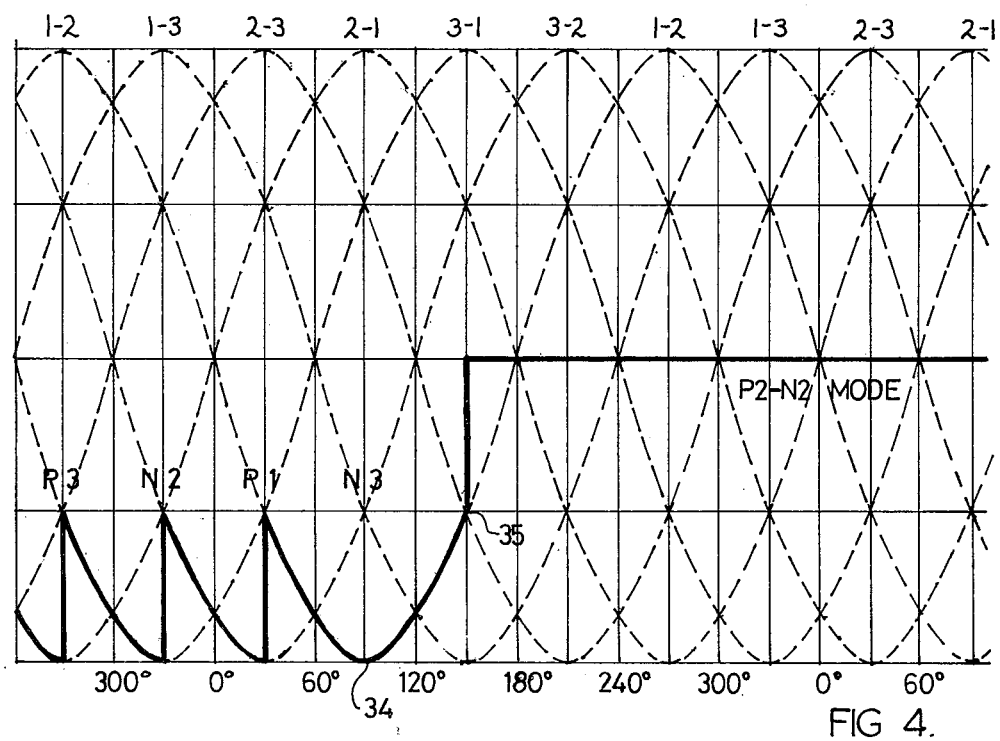
FIG 4.
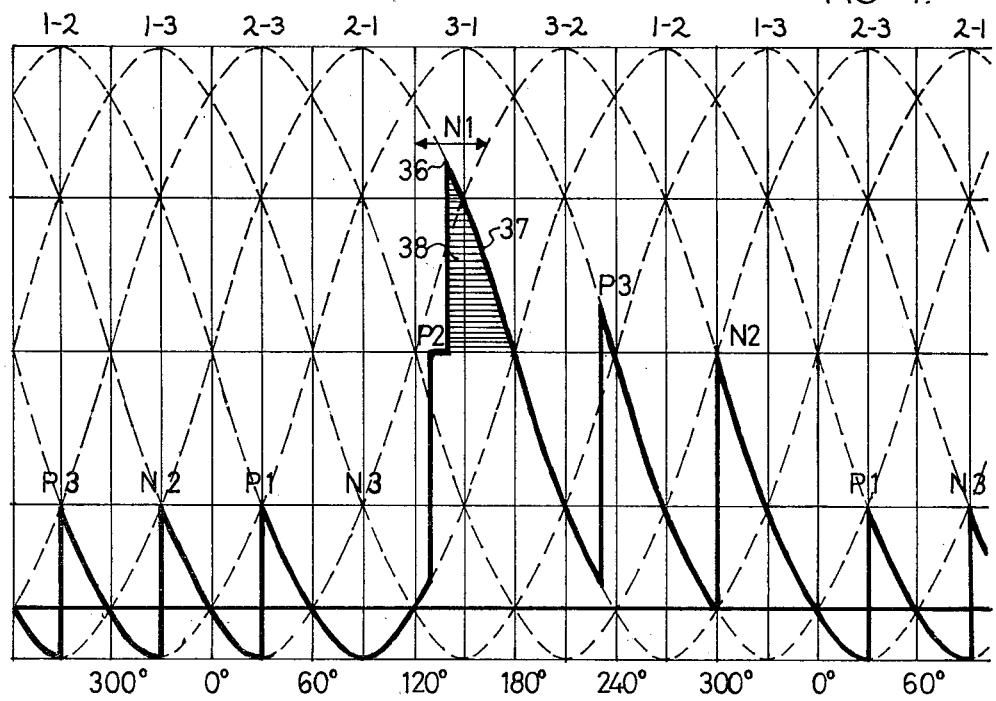
FIG 5.
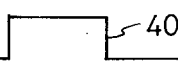
FIG 7A.
FIG 7B.
FIG 7C.

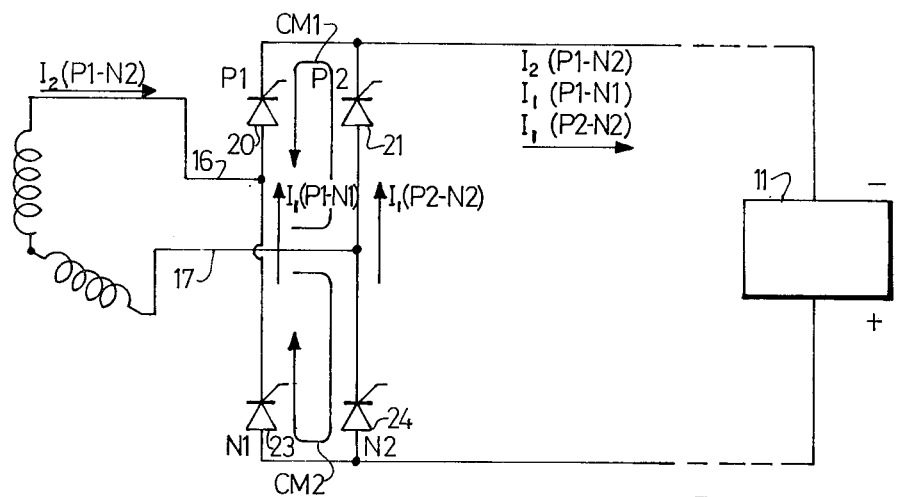
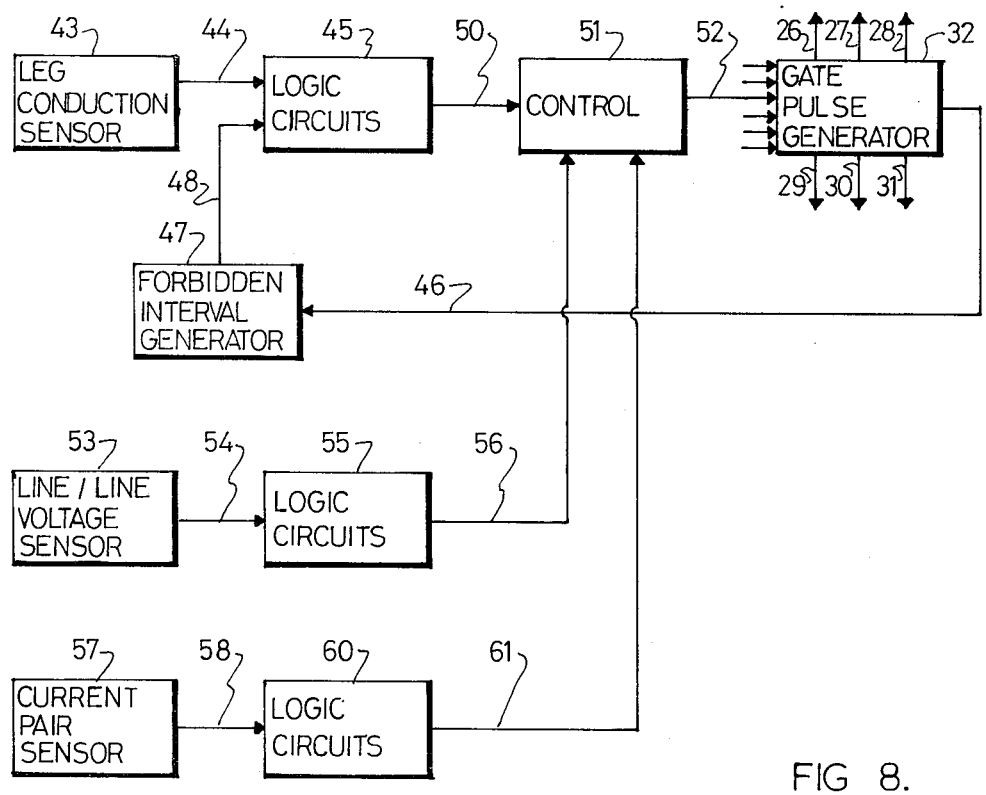
FIG 6.
FIG 8.

CONDUCTION THROUGH SENSING AND INVERTER PROTECTION SYSTEM

BACKGROUND OF THE INVENTION

The present invention relates generally to an inverter control or protection system and more particularly to a system for the detection and correction of a conduction-through fault.

Conduction-through faults or "shoot-throughs" have been a problem in inverters for many years. A conduction-through fault is, very briefly, the failure of one or more thyristors in the inverter to commutate or achieve forward blocking at the end of its normal period of conduction. This failure to achieve forward blocking enables direct current to continue through the thyristor when the thyristor should be in the off state. A conduction-through fault may be caused by an inadequate commutation margin due to, for example, suppression or absence of gating, gating too late, excessive load current, severe line dip, and perhaps other circumstances.

The traditional approach in line commutated inverters (including its subspecies type sometimes referred to as a load commutated inverter) has been to prevent or reduce the chances of a conduction-through fault occurring by maintaining an adequate commutation angle as far as possible, and if a conduction-through fault should occur, to interrupt the fault current with a high speed circuit breaker or fuse. It is, however, desirable to attempt to recover from a conduction-through fault without shutting down or causing damage to the inverter.

In forced commutation type inverters, arrangements have been developed which may permit recovery from a conduction-through fault. Canadian Pat. No. 998,739 to Brenneisen et al, issued Oct. 19, 1976, describes such an arrangement. In this arrangement, when an overload in one branch is detected, all the thyristors are gated on thereby splitting the overload and reducing the current in the leg where the overload occurred. The inverter has inductive coils in each leg and an inductance in parallel with a capacitance across the input. The values are selected to provide a tuned circuit which is responsive to the current to cause an oscillatory current with a period twice as long as the maximum conductive period of a thyristor and an amplitude larger than the short circuit current. The oscillatory current will oppose the overload current and quench the thyristors.

The aforementioned arrangement is not readily applicable to line commutated inverters with which the present invention is concerned and is not economically attractive.

SUMMARY OF THE INVENTION

The present invention is concerned with a line commutated inverter and with recovery from a conduction-through fault resulting from an inadequate commutation margin due to suppression or absence of gating, gating too late, severe line dip, or other causes.

In accordance with one form of the invention there is provided an inverter control system for a line commutated inverter having a plurality of legs with gate controlled semiconductor means in each leg for controlling electrical conduction therethrough. The control system includes a gate pulse generator means for providing gate control signals to each semiconductor means to initiate conduction at a prescribed time, each leg having an interval during which conduction occurs in normal operation and a forbidden interval during which conduction should not occur. A conduction sensor for each leg detects conduction therethrough and provides a signal representative of conduction in that leg while a circuit means receives the signal representative of conduction for each leg and determines when conduction occurs in a leg during a forbidden interval. A control means, responsive to a signal from said circuit means indicating conduction during a forbidden interval, serves to advance the gate control signals for at least the next two gate control signals so that they occur immediately following the detection of conduction in a forbidden interval.

BRIEF DESCRIPTION OF THE DRAWING

While the present invention is particularly defined in the claims annexed to and forming a part of this specification, a better understanding can be had from the following description taken in conjunction with the accompanying drawing in which:

FIG. 4 is a waveform diagram useful in describing inverter operation leading to a mode 1 fault;

FIG. 5 is a waveform diagram useful in describing inverter operation having a conduction-through fault and a recovery in accordance with the invention;

FIG. 6 is a simplified schematic diagram of an inverter useful in describing recovery from a conduction through fault;

FIGS. 7A, 7B and 7C (on the same sheet of drawing as FIG. 5) are waveform diagrams useful in describing fault detection according to the invention;

FIG. 8 is a simplified block schematic diagram of the system of the invention;

DETAILED DESCRIPTION

Figure 1:
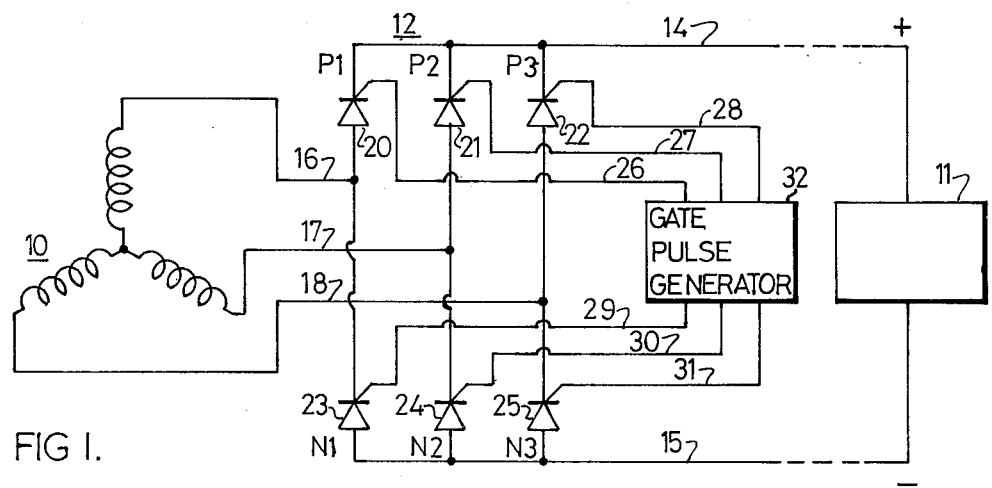
FIG. 1 is a schematic diagram in simplified form of a line commutated inverter.

Referring to FIG. 1, there is shown in schematic form a typical six pulse converter 12 connected between a transformer 10 (or other apparatus having inductance) and a direct current (DC) source 11 such as a DC machine, battery or fuel cells. As is known, the converter is capable of transforming or converting alternating current (AC) power to DC and converting DC power to AC. The present invention is concerned only with operation as an inverter; i.e., in converting DC to AC.

In FIG. 1, the six pulse inverter (converter) 12 comprises three positive legs P1, P2 and P3, and three negative legs N1, N2 and N3 as shown. Legs P1 and N1 are in series, legs p2 and N2 are in series and legs P3 and N3 are in series, and the three pairs are in parallel between a positive bus 14 and a negative bus 15. Lines 16, 17 and 18 connect the junction points between the legs of each pair to external apparatus such as a transformer 10. Each leg has a thyristor connected in it. Thus leg P1 has thyristor 20, leg P2 has thyristor 21, leg P3 has thyristor 22, leg N1 has thyristor 23, leg N2 has thyristor 24 and leg N3 has thyristor 25. the gate electrode of each of the thyristors 20–25 is connected by a conductor 26–31, respectively, to a gate pulse generator 32. As is well known, a trigger pulse or gate pulse on the gate electrode will enable the thyristor and if the voltages are correct the thyristor will conduct. Once conduction is initiated through a thyristor the conduction will continue until the current therethrough is driven to zero by another current (a commutating current) or until the voltage drops to zero or reverses.

In normal operation of inverter 12, the conduction pairs of legs would be:

P1-N2
P1-N3
P2-N3
P2-N1
P3-N1
P3-N2

In other words, at the beginning of the sequence indicated above, leg P1 has just commutated the previously conducting positive leg P3. The conduction pair at the beginning of the sequence is therefore P1, N2. Leg N3 then commutates leg N2 so the conduction pair is P1, N3. Then leg P2 commutates leg P1 so the conduction pair is P2, N3 and so on. The source of energy for the commutation is in transformer 10 which provides a commutating current sufficient to cause the thyristor in the leg being commutated to return to its nonconductive state as is known in the art.

Figure 2:
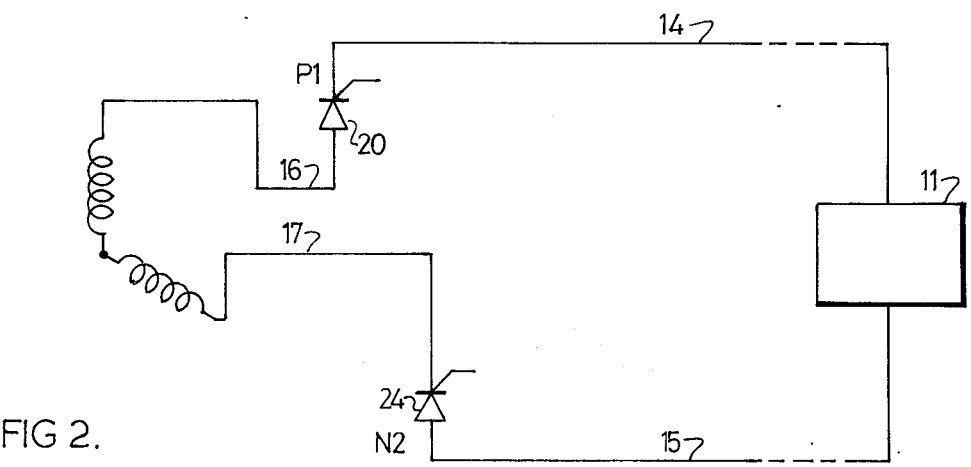
FIG. 2 is a simplified schematic diagram of parts of FIG. 1 useful to illustrate a mode 2 fault.

Suppose that leg N3 fails to commutate leg N2 for some reason. Leg N2 remains conducting. A mode 2 fault occurs and this is shown in FIG. 2. The thyristor 24 continues to conduct with thyristor 20 when N3 fails to commutate N2. The DC machine or other DC source 11 is essentially shorted by two transformer phases in series.

Figure 3:
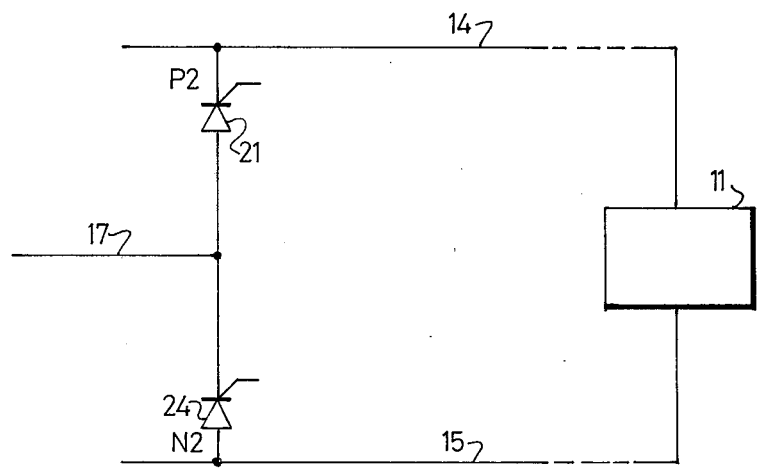
FIG. 3 is a simplified schematic diagram of parts of FIG. 1, useful to illustrate a mode 1 fault.

The next normal gating will be of thyristor 21 when leg P2 commutates leg P1. This can result in a mode 1 fault as shown in FIG. 3 where legs P2-N2 are a direct short on the DC source 11. It is possible in some circumstances to have combinations of mode 2 and mode 1 faults.

It is believed to be usual for a conduction-through fault to occur in a line commutated converter as a mode 2 fault and thereafter become a mode 1 fault in the manner described. If a fault can be detected at an early stage, for example before a mode 2 fault becomes an established mode 1 fault, then a suitable gating strategy for recovery may be devised in accordance with the invention to avoid a shutdown of the inverter. If the fault is not corrected, it must be cleared by a high speed circuit breaker or fuse arrangement.

Referring for the moment of FIG. 4, the waveforms include the phase-to-phase voltage (dashed lines) and illustrate in heavy lines the occurrence of when leg N3 fails to commutate N2, that is when P1-N3 fails to commutate P1-N2, as was discussed in connection with FIGS. 2 and 3. The inverter is shown by FIG. 4 to be operating at a phase angle $\alpha = 150°$, where $\alpha$ is the delay in electrical degrees from a reference to a thyristor firing or gating pulse. Legs P1-N2 are conducting and at point 34 leg N3 fails to commutate N2. A current $I_2$(P1-N2) continues to flow. Assuming no action is taken, at point 35 the thyristor 21 is switched on in its usual sequence. This initially adds a mode 1 current $I_1$(P2-N2). If there is no further gating of thyristors, the mode 2 fault will usually commutate (that is thyristor 20 will change to a non-conductive state) and the fault will continue as a mode 1 current $I_1$(P2-N2) until a breaker trips or a fuse blows. It is, of course, possible for the fault to continue as both a mode 1 and mode 2 fault until a high speed breaker is tripped or a fuse blows.

Referring now to FIG. 5, the waveform shows a recovery from a conduction-through fault in the manner of the invention. The recovery must be initiated without delay and the detection means which provides early fault detection will be described hereinafter. The gating strategy which enables a recovery to be made involves a double commutation and the two commutating steps may occur sequentially or simultaneously (i.e., coincidentally). The double commutation, in the particular conduction-through fault used as an example, comprises leg P1 to P2 and leg N2 to N1. This double commutation will result in a normally conducting pair P2-N1. The triggering of thyristors 21 (leg P2) and 23 (leg N1) are accelerated from the normal firing time in response to detection of a mode 2 fault (in P1-N2). Thyristor 21 is switched to its conducting state or triggered on at a time represented at 35 and thyristor 23 is switched to its conducting state at a time represented at 36. When thyristor 21 is switched on it adds a mode 1 fault current $I_1$(P2-N2) and when thyristor 23 is switched on it adds a mode 1 fault current $I_1$(P1-N1). If the double commutation is successful, normal operation is restored as is indicated by solid line 37 following time 36. It is important that thyristor 23 be switched on early because leg N1 must conduct while sufficient energy remains in the AC part of the circuitry to cause a double commutation. In other words there must be a predetermined level of volt-seconds to provide sufficient commutating current.

While an understanding of the theory is not necessary to practice the invention, it is suggested that the following explanation of the double commutation may be appropriate. With the early gating on of thyristors 21 and 23, three currents may then be present in the inverter. The currents are:

$I_2$(P1-N2)
$I_1$(P2-N2)
$I_1$(P1-N1)

Referring now to FIG. 6, the first fault current to flow is $I_2$(P1-N2) and this is the short circuit current with respect to source 11, which is shown as having a counter emf (counter electromotive force). When thyristor 21 is gated on the mode 1 fault current $I_1$(P2-N1) will start to flow. At this time the voltage between lines 17 and 16 is normally positive, and a commutating current CM1 will flow from line 17 through leg P2 and leg P1 to line 16. This current will try to commutate leg P1; that is, it will try to switch thyristor 20 to a non-conducting state. Now, thyristor 23 is switched or gated on and an additional mode 1 fault current $I_1$(P1-N1) will start to flow. Also, because of the voltage between lines 17 and 16, a commutating current CM2 will flow from line 17 through thyristor 24 and thyristor 23 to line 16. This current will try to commutate leg N2; that is, it will try to switch thyristor 24 to a nonconducting state. The commutating current should be at least twice the total fault current to achieve a coincidental double commutation. It will be seen that the mode 1 fault currents will build up as a function of the number of electrical degrees since gating, and that the energy available to drive the commutating currents as described will decrease with time. The commutating currents are determined by the volt-seconds represented by the shaded area 38 in FIG. 5. An early gating of thyristor 23 (leg N1) will increase this area, that is will increase the volt-seconds available.

In the double commutation, the actual commutation of both legs as described may take place coincidentally; that is, thyristor 20 and 24 may be changed to their nonconducting state at the same time by commutating currents CM1 and CM2. The commutation also may take place sequentially; that is, thyristor 20 (leg P1) may be changed to its nonconducting state before thyristor 24 is changed to its nonconducting state or perhaps thyristor 20 may be changed to its nonconducting state before thyristor 23 (leg N1) is gated on. If the commutation is sequential, less commutating current is necessary; i.e., fewer volt-seconds are required to complete the double commutation. It is believed that it is not significant to an understanding of the invention whether the actual double commutation is sequential or coincidental.

As was previously mentioned, the detection of a conduction-through fault must be early and accurate. This early detection will now be described. For each leg there is a unique interval where current should not be flowing in normal operation. This forbidden interval is approximately 60 electrical degrees. For example, referring to FIG. 5, there should be no current flowing in leg N2 for the interval 120° and 180° (taken in relation to the voltage across conductors 17 and 16). It will be recalled that in the example discussed in connection with FIG. 5, the leg N3 fails to commutate leg N2; that is, thyristor 24 remains conducting when it should be commutated off. Thus, if current is sensed in leg N2 during this forbidden interval, it means thyristor 24 has failed to switch off and a mode 2 fault has occurred. FIG. 7A shows a waveform 40 representing the critical interval for leg N2. While the critical interval is 60 degrees, detection should take place early in this interval as was previously described, in order that thyristor 23 (leg N1) can be triggered early. The waveform 41 in FIG. 7B represents a normal conduction time for leg N2 and waveform 42 in FIG. 7C represents conduction for N2 which extends into the forbidden interval as represented by waveform 40. The fault current for N2 can be detected as soon as the current extends into the forbidden time interval.

The example discussed was for failure of leg N3 to commutate leg N2. The following table will show the forbidden interval for all six possible failures.

tion to provide an even earlier indication of a fault. The fixed forbidden interval, shown in FIG. 7A as waveform 40 is, however, satisfactory. It provides for detection that is sufficiently early with relatively simple circuitry.

Referring now to FIG. 8, the block schematic shows, in general form, suitable circuitry for use in accordance with the invention. Additional description can be had from a paper titled "Conduction-Through Sensing and Protection—DC Motor Drive Applications" (Conference Record paper 77-CH1246-8-1A) which was presented by the inventor at the October, 1977 IEEE/IAS Annual Meeting held in Los Angeles, California. A leg conduction sensor 43 is provided for each leg to sense whether or not that leg is conducting current. A conduction sensor is described in Canadian Pat. No. 959,543 to Young, issued Dec. 17, 1974. This sensor reduces sensitivity to voltage fluctuation and is appropriate for sensor 43. However, any sensor that can detect conduction would be suitable. The sensor 43 provides on conductor 44 a signal, which represents either conduction or nonconduction, to logic circuitry 45 which will be further described with respect to FIG. 9. A forbidden interval generator 47 (to be further described with respect to FIGS. 10 and 11) receives a timing signal via conductor 46 from the timing circuitry of gate pulse generator 32, and provides on conductor 48 a signal representing the forbidden interval (e.g., waveform 40, FIG. 7A). Logic circuitry 45 determines if there is conduction in the forbidden interval for that leg, and provides a corresponding signal on conductor 50 to control 51. If there is conduction in the forbidden interval, control 51 provides a signal on conductor 52 to gate pulse generator 32 which:

(a) provides a two stage correction timing interval,
(b) advances the triggering gate pulses by a first amount during the first stage correction timing interval,
(c) advances the triggering pulses by a second predetermined amount during the second stage correction timing interval, and
(d) inhibits the operation of such controls as an automatic current regulator and other controls for the correction timing interval.

The correction timing interval has two stages to en-

| UNSUCCESSFUL COMMUTATION GATING | MODE 2 FAULT PAIR | EARLIEST LEG WITH FAULT CURRENT RANGE (Relative to voltage line 17.16) | | |
|---|---|---|---|---|
| | | LEG | GATING | CONDUCTION | FORBIDDEN |
| 1 P1-N2 | P3-N2 | P3 | 120°–300° | 120°–60° | 60°–120° |
| 2 P1-N3 | P1-N2 | N2 | 180°–360° | 180°–120° | 120°–180° |
| 3 P2-N3 | P1-N3 | P1 | 240°–60° | 240°–180° | 180°–240° |
| 4 P2-N1 | P2-N3 | N3 | 300°–120° | 300°–240° | 240°–300° |
| 5 P3-N1 | P2-N1 | P2 | 360°–180° | 360°–300° | 300°–360° |
| 6 P3-N2 | P3-N1 | N1 | 60°–240° | 60°–360° | 360°–60° |

It should be noted that, with reference to the example discussed in connection with FIGS. 5 and 7, the forbidden interval is from 120°–180° (taken with reference to the line-to-line voltage between lines 17 and 16). Also, as indicated by the waveform 41 in FIG. 7B, the normal conducting period of thyristor 24 ends somewhat before this, perhaps at about the 90° reference as shown. It is possible to determine from the operating conditions when the normal conducting period ends under those conditions and to extend the forbidden interval forward somewhat towards (but not as far as) the end of conducable the inverter to make a smoother recovery following the fault. The first stage is a short interval where the triggering or gating pulses are advanced with a predetermined limit of perhaps 60°. With reference to FIG. 5, for example, thyristor 21 is gated on approximately as soon as the fault is detected, and thyristor 23 (leg N1) shortly after. Both these are within the 60° limit. The first stage of the correction timing interval is just long enough to permit these two gating signals to be provided. If the advance to 60° were to remain, the currents might become excessive, so the second stage interval provides for an advance in bias to about 120°. The second stage interval is two or three times longer than the first stage and several gating signals are provided as can be seen in FIG. 5. In normal practice the second stage advances perhaps 3-5 gating signals. This tends to decrease the current surges. At the end of the correction timing interval, normal operation resumes.

It will be apparent from the preceding description and particularly from FIG. 8 and the related preceding description, that there is a leg conduction sensor 43 for each leg with associated circuitry to provide control signals for each leg to gate pulse generator 32.

Figure 9:
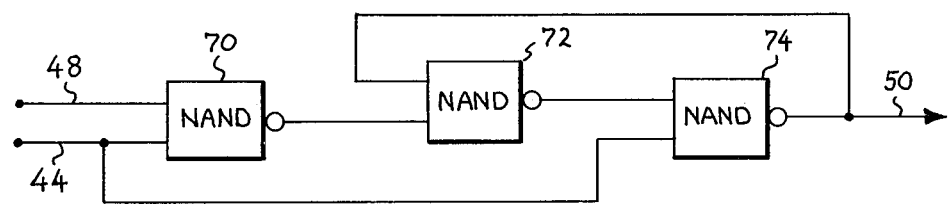
FIGS. 9 and 10 illustrate in detail a portion of the elements shown in block form in FIG. 8; and, FIG. 11 illustrates waveshapes helpful in understanding the operation of the circuit of FIG. 10.

FIG. 9 illustrates one possible form the logic circuit 45 of FIG. 8 might assume. As before, one such logic circuit would exist for each leg. In FIG. 9, the signals on the two lines 44 and 48 (see FIG. 8) are shown as inputs to a first NAND gate 70 to the output of which forms one input to a second NAND gate 72 which in turn outputs a signal serving as one input to a third NAND gate 74. The signal on line 44 serves as a second input to NAND gate 74 and the output of gate 74 forms the second input to NAND gate 72. (This figure corresponds to FIG. 14a of the previously mentioned IEEE/IAS paper). In the operation of the FIG. 9 logic circuit, as an example, if thyristor 20 in leg P1 is in conduction (as would be the case when the voltage across thyristor 20 is less than some threshold level) while the signal on line 48 is a logic 1, then the output of NAND gate 74 will go to a logic 1 when thyristor 20 ceases conduction and the signal on line 44 then becomes a logic 0.

Figure 10:
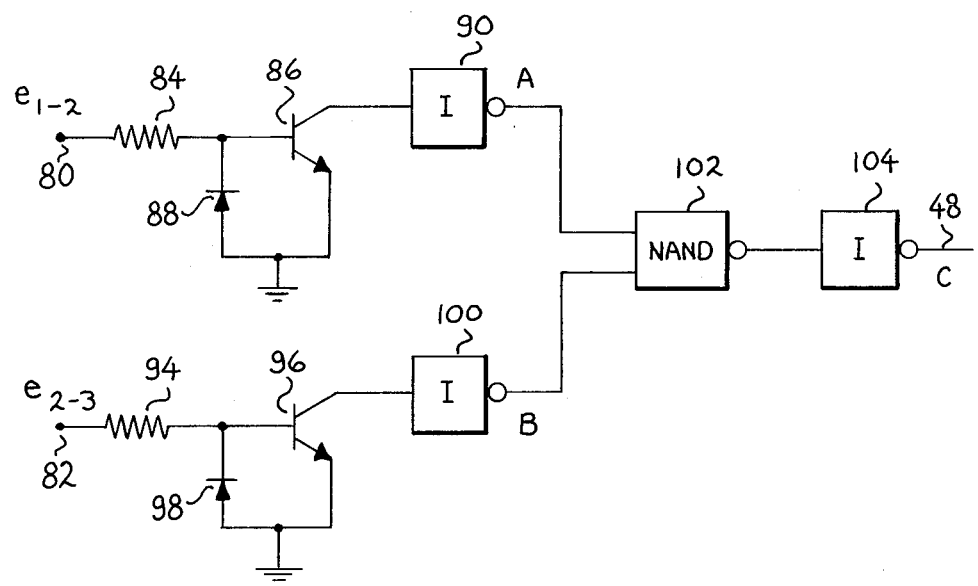
Figure 11:
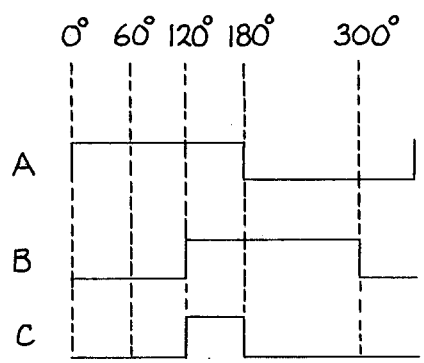

FIG. 10 shows one possible embodiment of the forbidden interval generator 47 of FIG. 8 while FIG. 11 illustrates waveforms defining the circuit operation. Referencing now FIGS. 10 and 11, it is seen that the phase-to-phase voltages $e_{1-2}$ and $e_{2-3}$ (see FIG. 5) are applied to respective terminals 80 and 82 of the circuit. The signal at terminal 80 is applied by way of a resistor 84 to the base of a transistor 86 which is further connected to ground by way of a diode 88. The transistor 86 has its emitter connected to ground while its collector forms the input to an inverter 90. As shown in graph A of FIG. 11, the output of inverter 90 will be at a logic 1 for approximately 180°. An identical circuit including resistor 94, transistor 96, diode 98 and inverter 100 connected to terminal 82 develops a B signal at the output of inverter 100 which is shown in FIG. 11 to be at a logic 1 for approximately 180° but lagging the A signal by about 120°. The A and B signals form the two inputs to a NAND gate 102 the output of which is inverted by an inverter 104 the output of which is the signal on line 48 (signal C in FIGS. 10 and 11). As shown in FIG. 11, the signal on line 48 indicating the forbidden interval for firing (signal C) is present for approximately 60° during the concurrence of the A and B signals.

Referring again to FIG. 8, there are two auxiliary circuits shown. These circuits are not necessary to the invention but it may be convenient or desirable to include one or both in an operating protection system of the invention.

It will be recalled that the volt-seconds available for the commutating currents are important. The shaded area 38 (FIG. 5) indicates the available volt-seconds in the particular example described with reference to FIG. 5. These volt-seconds can be determined from the line-to-line voltage involved. Thus, with reference to the example described, and particularly with reference to FIG. 6, the volt-seconds available for recovery can be determined from line-to-line voltage between lines 17 and 16. Thus, line/line voltage sensor 53 monitors the voltage and provides a signal on conductor 54 representing this voltage. Logic circuitry 55 receives the signal and determines the volt-seconds available. Logic circuitry 55 provides a signal on conductor 56 representing available volt-seconds, and control 51 receives this signal and determines if the volt-seconds are sufficient for recovery when a mode 2 fault occurs. If, for some reason, the volt-seconds available are insufficient for recovery according to the invention, the inverter can be shut down or other appropriate action taken.

A current pair sensor 57 is also shown in FIG. 8. There is a current pair sensor for each of the three pairs, and each sensor is responsive to current through the pair. In other words the sensor is responsive only to a mode 1 fault current. Current sensor 57 provides a signal on conductor 58 representing current in a pair of legs, for example in legs P2-N2. Logic circuitry receives this signal, determines a mode 1 fault exists and provides a signal on conductor 61 to control 51. Control 51 may use the signal to confirm a mode 1 fault, to check correction of the fault within a predetermined time, and/or to trip protective breakers if the fault is not corrected in time.

The inverter protection system as described herein in accordance with the invention detects conduction-through faults in line commutated inverters at an early stage in a mode 2 fault and provides a control sequence to recover from such fault current.

While there has been shown and described what is at present considered to be the preferred embodiment of the invention, modifications thereto will readily occur to those skilled in the art. It is not desired, therefore, that the invention be limited to the specific embodiment shown and described and it is intended to cover in the appended claims all such modifications as fall within the true spirit and scope of the invention.

What is claimed is:

1. An inverter control system for a line commutated inverter having a plurality of legs with gate controlled semiconductor means in each leg for controlling conduction therethrough, comprising:
    (a) gate pulse generator means for providing gate control signals to each semiconductor means to initiate conduction at a prescribed time, each leg having an interval during which conduction occurs in normal operation and a forbidden interval during which conduction should not occur;
    (b) a conduction sensor for each leg for detecting conduction therethrough and providing a signal representative of conduction in that leg;
    (c) circuit means for receiving the signal representative of conduction for each leg and determining when conduction occurs in a leg during a forbidden interval; and,
    (d) control means responsive to a signal from said circuit means indicating conduction during a forbidden interval for advancing the gate control signals for at least the next two gate control signals so that they occur immediately following the detection of conduction in a forbidden interval.

2. An inverter control system for a line commutated inverter having a plurality of legs with thyristor means in each leg for controlling conduction therethrough, comprising:
    (a) a gate pulse generator for providing gating control signals to each thyristor means to gate said thyristor means on and initiate conduction through each respective leg at a prescribed time, each leg having an interval during which conduction occurs in normal operation and a forbidden interval during which conduction should not occur;

(b) a forbidden interval signal generator means receiving a timing signal from said gate pulse generator and responsive thereto for providing for each leg a first signal representing the forbidden interval;

(c) a conduction sensor for each leg for detecting conduction through the thyristor means therein and providing for each leg a second signal representative of conduction in that leg;

(d) circuit means for receiving said first and second signals and providing for each leg a third signal with conduction in the forbidden interval representative of a conduction-through fault; and, (e) control means responsive to said third signal for advancing the gating control signals from the gate pulse generator for at least the next two gate pulses to commutate said fault.

3. An inverter control system as defined in claim 2 in which said control means advances the next two gating pulses to take place as soon as conduction in a forbidden interval is detected, said advance not to exceed a limit of 60°.

4. An inverter control system as defined in claim 3 in which said control means advances the next succeeding three to five gating pulses by an amount not to exceed 120°, and then returns to normal operation.

5. An inverter control system as defined in any one of claims 2, 3 or 4 and further comprising a line-to-line voltage sensor connected on the AC side of the inverter to derive a signal representing voltage, and circuit means receiving said signal from said voltage sensor and determining therefrom if sufficient volt-seconds are available to commutate the fault at the time it is detected.

6. An inverter control system as defined in any one of claims 2, 3 or 4 and further comprising means responsive to said third signal for inhibiting automatic current control systems until the fault is corrected and normal operation restored.

7. An inverter control system as defined in any one of claims 2, 3 or 4 and further comprising:

(a) a current pair sensor for each pair of legs responsive to a mode 1 fault current through the respective pair to provide a mode 1 fault current signal; and, (b) means responsive to said mode 1 fault current signal indicating a mode 1 fault has existed for a predetermined time to shut down said inverter.

8. An inverter control system as defined in claim 3 in which said advance is to 60°.

9. An inverter control system as defined in claim 4 in which said next three to five gating pulses are advanced to 120°.

* * * * *